US012592355B2

(12) United States Patent
Greenland

(10) Patent No.: US 12,592,355 B2
(45) Date of Patent: Mar. 31, 2026

(54) MOUNTED PLANAR FILAMENT

(71) Applicant: Moxtek, Inc., Orem, UT (US)

(72) Inventor: Kasey Otho Greenland, South Jordan, UT (US)

(73) Assignee: MOXTEK, INC., Orem, UT (US)

( * ) Notice: Subject to any disclaimer, the term of this patent is extended or adjusted under 35 U.S.C. 154(b) by 151 days.

(21) Appl. No.: 18/787,669

(22) Filed: Jul. 29, 2024

(65) Prior Publication Data

US 2025/0079108 A1 Mar. 6, 2025

Related U.S. Application Data

(60) Provisional application No. 63/579,091, filed on Aug. 28, 2023.

(51) Int. Cl.

| | |
|---|---|
| ***H01J 35/06*** | (2006.01) |
| ***H01J 1/16*** | (2006.01) |
| ***H01J 1/18*** | (2006.01) |
| ***H01J 1/92*** | (2006.01) |
| ***H01J 3/40*** | (2006.01) |

(52) U.S. Cl.

CPC .............. *H01J 35/064* (2019.05); *H01J 1/16* (2013.01); *H01J 1/18* (2013.01); *H01J 1/92* (2013.01); *H01J 3/40* (2013.01); *H01J 35/066* (2019.05); *H01J 2201/02* (2013.01); *H01J 2201/2871* (2013.01); *H01J 2201/2878* (2013.01); *H01J 2235/0233* (2013.01); *H01J 2235/06* (2013.01); *H01J 2235/168* (2013.01)

(58) Field of Classification Search

None

See application file for complete search history.

(56) References Cited

U.S. PATENT DOCUMENTS

| | | | | |
|---|---|---|---|---|
| 4,777,642 A * | 10/1988 | Ono | H01J 35/147 378/138 |
| 7,924,983 B2 * | 4/2011 | Moore | H01J 1/15 378/136 |
| 8,077,829 B2 * | 12/2011 | Moore | H01J 35/064 378/136 |
| 8,247,971 B1 | 8/2012 | Bard et al. | |
| 8,254,526 B2 * | 8/2012 | Hauttmann | H01J 35/064 378/136 |
| 11,728,120 B2 | 8/2023 | Miller | |
| 12,374,518 B2 * | 7/2025 | Greenland | H01J 35/064 |

(Continued)

*Primary Examiner* — Thomas R Artman

(74) *Attorney, Agent, or Firm* — Thorpe North & Western, LLP

(57) ABSTRACT

A filament assembly 10 for an x-ray tube 20 can include a planar filament 11 electrically-coupled between and substantially-encircled by a pair of collector plates C1 and C2. The pair of collector plates C1 and C2 can support the planar filament 11 so that it does not twist or warp and align the filament assembly 10 within a cathode cup 33. The pair of collector plates C1 and C2 can block electrons emitted from a back side of the filament. Without the collector plates C1 and C2, back side electrons can change direction by about 180°, hit the target, and distort a target electron spot. Each collector plate C1 or C2 can include holes H1 and H2. These holes H1 and H2 can aid in alignment of the collector plates C1 and C2 with electrodes 31 and electrode 32, can allow welding at a lower temperature, and can facilitate weld inspection.

20 Claims, 3 Drawing Sheets

(56) References Cited

U.S. PATENT DOCUMENTS

| | | | | |
|---|---|---|---|---|
| 2009/0323898 A1* | 12/2009 | Moore | H01J 35/066 | 378/136 |
| 2010/0195797 A1* | 8/2010 | Hauttmann | H01J 35/064 | 313/341 |
| 2010/0239828 A1* | 9/2010 | Cornaby | H01J 35/064 | 428/195.1 |
| 2010/0284519 A1* | 11/2010 | Moore | H01J 35/064 | 29/525.01 |
| 2012/0212157 A1* | 8/2012 | Cornaby | H01K 1/14 | 313/310 |
| 2022/0254594 A1* | 8/2022 | Miller | H01J 35/064 | |
| 2024/0021400 A1* | 1/2024 | Greenland | H01J 35/064 | |
| 2025/0079108 A1* | 3/2025 | Greenland | H01J 35/064 | |
| 2025/0316436 A1* | 10/2025 | Greenland | H01J 35/064 | |

* cited by examiner

MOUNTED PLANAR FILAMENT

CLAIM OF PRIORITY

This application claims priority to US Provisional Patent Application No. U.S. 63/579,091, filed on Aug. 28, 2023, which is incorporated herein by reference.

FIELD OF THE INVENTION

The present application is related to x-ray sources.

BACKGROUND

X-rays have many uses, including imaging, x-ray fluorescence analysis, x-ray diffraction analysis, and electrostatic dissipation.

A large voltage between a cathode and an anode of the x-ray tube, and a heated filament at the cathode, can cause electrons to emit from the filament to the anode. The anode can include a target. The target can generate x-rays in response to impinging electrons from the cathode.

BRIEF DESCRIPTION OF THE DRAWINGS (DRAWINGS MIGHT NOT BE DRAWN TO SCALE)

Figure 1:
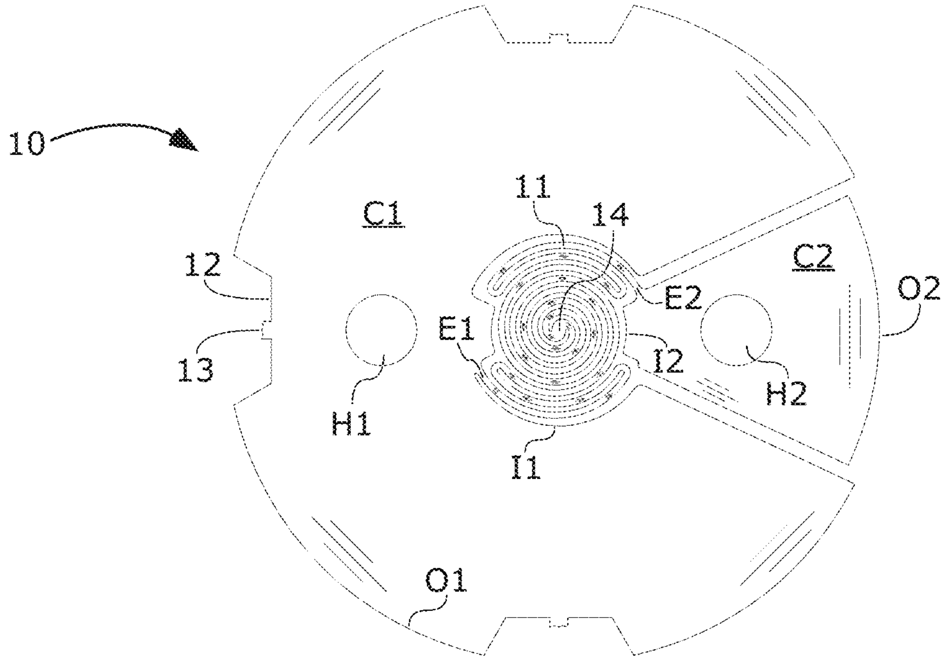

FIG. 1 is a top-view of a filament assembly 10 with a filament 11 and a pair of collector plates C1 and C2.

Figure 2:
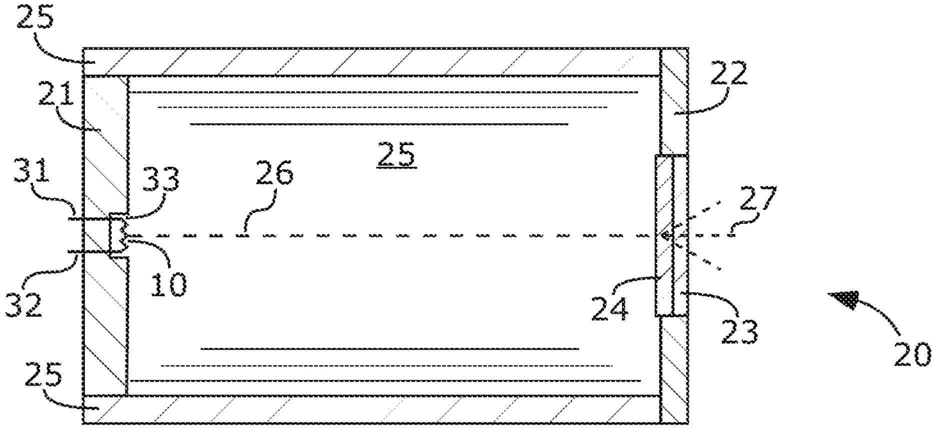

FIG. 2 is a cross-sectional side-view of an x-ray tube 20 with a cathode 21 and an anode 22 electrically insulated from one another. The cathode 21 can include a filament assembly 10 as described herein.

Figure 3:
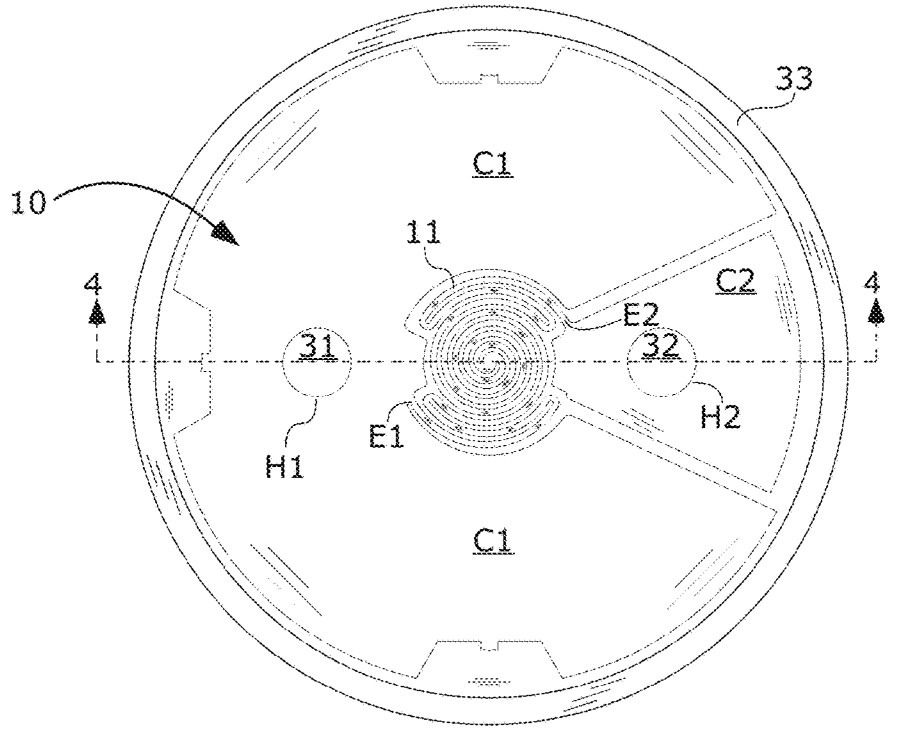

FIG. 3 is a top-view of the filament assembly 10 mounted on a first electrode 31 and a second electrode 32. The first electrode 31 is bonded to the first collector plate C1 at a first hole H1 and the second electrode 32 is bonded to the second collector plate C2 at a second hole H2. The filament assembly 10 is located at an opening of a cathode cup 33.

Figure 4:
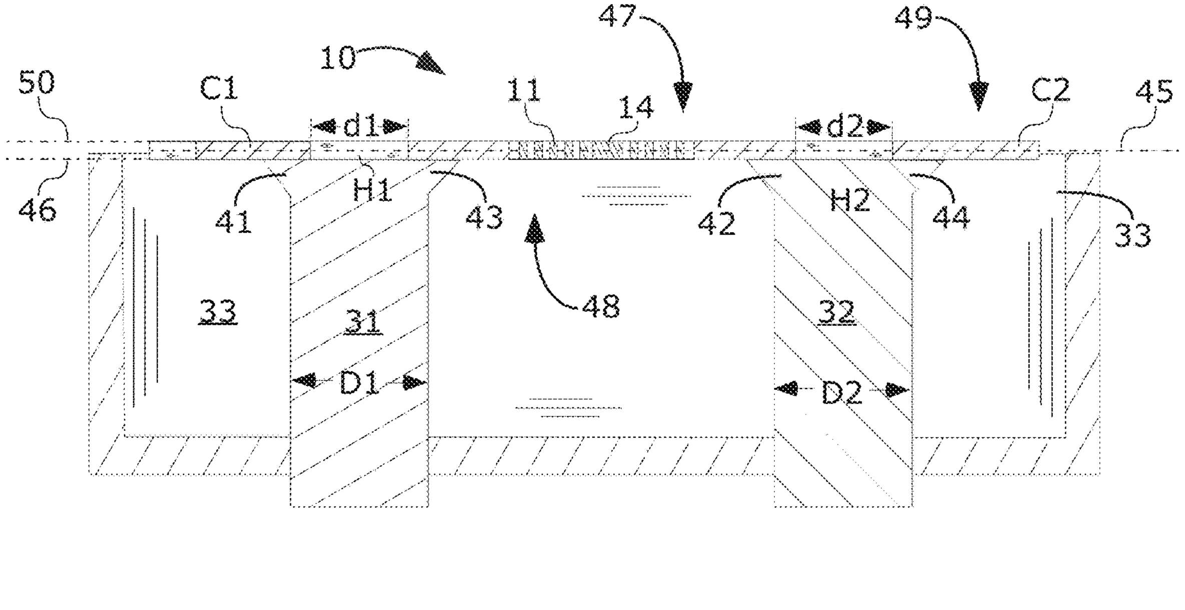

FIG. 4 is a cross-sectional side-view of the filament assembly 10, electrodes 31 and 32, and cathode cup 33 of FIG. 3, taken along line 4-4 in FIG. 3.

Figure 5:
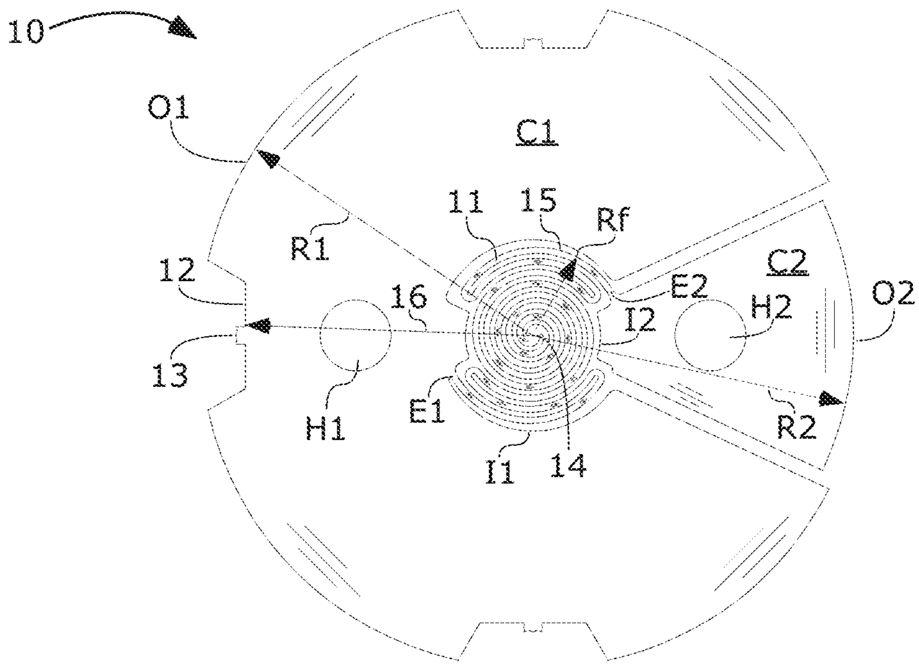

FIG. 5 is a top-view of the filament assembly 10 of FIG. 1, further illustrating the following potential relationships of radii: R1>Rf, R2>Rf, and R1>R2.

Figure 6:
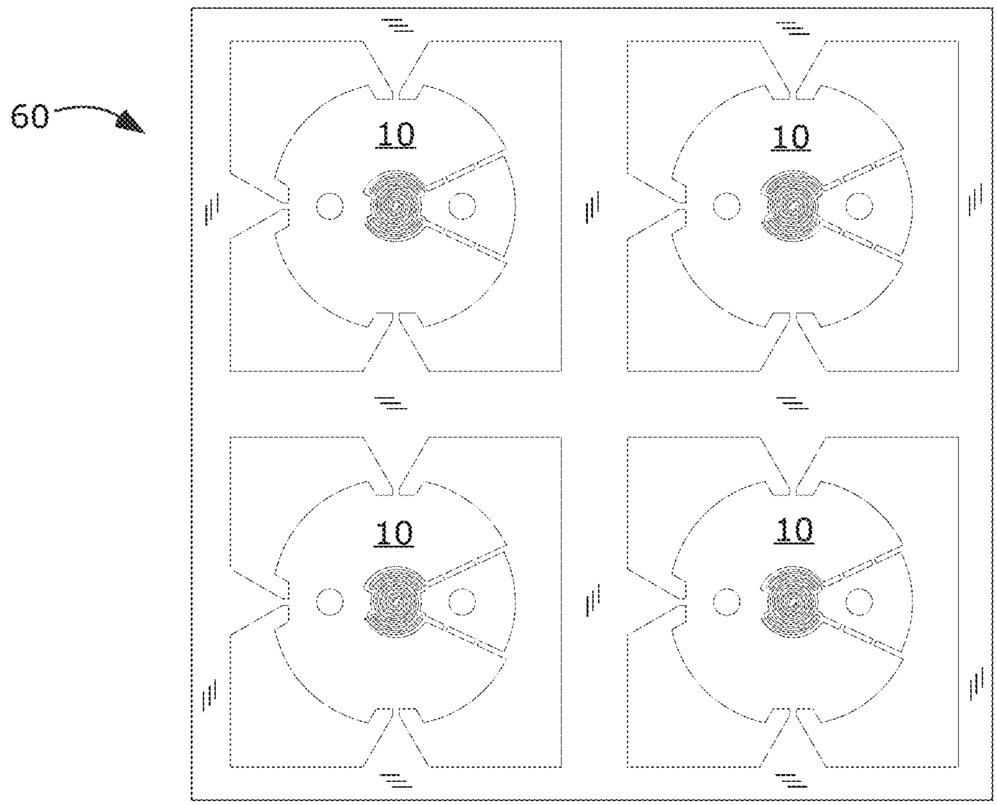

FIG. 6 is a top-view of a filament group 60 with four filament assemblies 10. During manufacturing, multiple filament assemblies 10 can be connected as shown.

DEFINITIONS

The following definitions, including plurals of the same, apply throughout this patent application.

As used herein, the terms "on", "located on", "located at", and "located over" mean located directly on or located over with some other solid material between. The terms "located directly on", "adjoin", "adjoins", and "adjoining" mean direct and immediate contact.

As used herein, the term parallel means exactly parallel; parallel within normal manufacturing tolerances; or almost exactly parallel, such that any deviation from exactly parallel would have negligible effect for ordinary use of the device.

As used herein, the term "x-ray tube" is not limited to tubular/cylindrical shaped devices. The term "tube" is used because this is the standard term used for x-ray emitting devices.

DETAILED DESCRIPTION

An x-ray tube can include a filament for emission of electrons. A planar filament can be preferred for focusing the electron beam to a circular spot. It can be difficult, however, to place the filament repeatedly in the appropriate location.

Failure to align the filament within a cathode cup, in every x-ray tube manufactured, can result in undesirable variance in x-ray spot location between different x-ray tubes.

Planar filaments can twist or warp. This can adversely affect the electron beam shape and focusing.

Placing a tiny filament on electrodes can be difficult for operators, and can result in variation between different x-ray tubes. Welding the filament to electrodes can result in overheating of the filament or surrounding material, which can further warp or damage the filament or other material.

A weld beneath the filament can be difficult or impossible to inspect. Without proper inspection, x-ray tubes that lack a properly welded filament can be sold and installed in expensive equipment. Improperly welded filaments can result in early failure of the x-ray tube, and of the tool which uses the x-ray tube.

A filament can emit electrons in all directions. A planar filament typically emits electrons in a desirable direction, towards the anode target, from a top side of the planar filament that faces the target. The planar filament also can emit electrons in an undesirable direction, towards a cathode cup, from a bottom side of the planar filament. The bottom side is opposite of the top side. The electrons from the bottom side can change direction (e.g. about 180°), due to a negative voltage of the cathode cup, pass between filament wires, and emit towards the target. These electrons from the bottom side are not focused properly. Therefore, the bottom side electrons can result in a misshaped electron spot at the target.

The filament assemblies 10 described herein can solve the previously noted problems. Each embodiment can solve one, some, or all of these problems.

As illustrated in FIG. 1, a filament assembly 10 can include a filament 11 and a pair of collector plates C1 and C2. The collector plates C1 and C2 can provide support for the filament 11 and reduce twisting or warping of the filament 11.

The filament 11 can consist of or can include an elongated wire extending, non-linearly in a plane (parallel with the sheet of the paper in FIGS. 1, 3, and 5, or plane 45 in FIG. 4), between a first end E1 and a second end E2 of the filament 11. A planar dimension of the pair of collector plates C1 and C2 can be located in this plane.

A top side 47 of the pair of collector plates C1 and C2 and of the filament 11 can be aligned and co-planar with each other. The top side 47 can face the target 24 (FIGS. 2 and 4).

A bottom side 48 of the pair of collector plates C1 and C2 and of the filament 11 can be aligned and co-planar with each other. The bottom side 48 can face away from the target 24 (FIGS. 2 and 4). The bottom side 48 can be opposite of the top side 47.

The top side 47 can be aligned with a top plane 50. The bottom side 48 can be aligned with a bottom plane 46. The top plane 50 can be parallel to the bottom plane 46. A thickness of the pair of collector plates C1 and C2 can equal a thickness of the filament 11. The thickness can be measured perpendicularly to the plane 45.

The pair of collector plates C1 and C2 can be separated from each other (i.e. not directly touch, not adjoin). The pair of collector plates C1 and C2 can be electrically coupled to each other by the filament 11. The filament 11 can be the only structure that is in an electrical circuit between the pair of collector plates C1 and C2.

The pair of collector plates C1 and C2 can include a first collector plate C1 and a second collector plate C2. The first collector plate C1 can be electrically-coupled to the first end E1 of the filament 11. The first collector plate C1 can adjoin the first end E1 of the filament 11. The second collector plate C2 can be electrically-coupled to the second end E2 of the filament 11. The second collector plate C2 can adjoin the second end E2 of the filament 11.

As illustrated in FIG. 1, an outer perimeter O1 of the first collector plate C1 can have an arc shape. The arc shape of the outer perimeter O1 of the first collector plate C1 can match, or be similar to, an outer curvature of the filament 11. An outer perimeter O2 of the second collector plate C2 have an arc shape. The arc shape of the outer perimeter O2 of the second collector plate C2 can match, or be similar to, an outer curvature of the filament 11.

An inner perimeter I1 of the first collector plate C1 can have an arc shape. The arc shape of the inner perimeter I1 of the first collector plate C1 can match, or be similar to, an outer curvature of the filament 11. An inner perimeter 12 of the second collector plate C2 can have an arc shape. The arc shape of the inner perimeter 12 of the second collector plate C2 can match, or be similar to, an outer curvature of the filament 11.

As illustrated in FIG. 2, the filament assembly 10 described herein can be used in an x-ray tube 20. The x-ray tube 20 can include a cathode 21 and an anode 22 electrically insulated from one another (e.g. by vacuum and by a ceramic or glass tube 25). The cathode 21 can include the filament assembly 10 with the filament 11 configured to emit electrons towards the anode 22. The filament assembly 10 can be mounted on a pair of electrodes 31 and 32 and located in a cathode cup 33. The anode 22 can include a target 24 with a high atomic number material. The target 24 can generate x-rays 27 in response to impinging electrons 26 from the filament 11.

A transmission-target x-ray tube 20 is shown in FIG. 2, with the target 24 on an x-ray window 23. The filament assembly 10 described herein is also applicable to reflection-target and side-window x-ray tubes.

As illustrated in FIG. 2, a first electrode 31 and a second electrode 32 can each extend from outside the x-ray tube 20 to an interior of the x-ray tube 20. A power supply can provide a voltage across the first electrode 31 and the second electrode 32, thus causing an electrical current to pass through and heat the filament 11 so that the filament is capable of being heated by the voltage and the electrical current through the electrical current path.

An electrical current path can be from the first electrode 31 to and through the first collector plate C1, from the first collector plate C1 to the first end E1 of the filament 11 and through the filament 11 to the second end E2 of the filament 11, from the second end E2 of the filament 11 to and through the second collector plate C2 to the second electrode 32.

As illustrated in FIGS. 3 and 4, the first collector plate C1 can include a first hole H1 aligned with the first electrode 31, and the second collector plate C2 can include a second hole H2 aligned with the second electrode 32. The first electrode 31 can be bonded to the first collector plate C1 at the first hole H1 and the second electrode 32 can be bonded to the second collector plate C2 at the second hole H2.

A diameter d1 of the first hole H1 can be smaller than an outer diameter D1 of the first electrode 31. A diameter d2 of the second hole H2 can be smaller than an outer diameter D2 of the second electrode 32. Consequently, the first collector plate C1 can rest on top of the first electrode 31 and the second collector plate C2 can rest on top of the second electrode 32. This design avoids sharp electrical field gradients that would otherwise result if the electrodes 31 and 32 protruded through the holes H1 and H2, respectively.

The first electrode 31 can span the first hole H1. The first electrode 31 can cover completely an opening of the first hole H1. The second electrode 32 can span the second hole H2. The second electrode 32 can cover completely an opening of the second hole H2.

The first collector plate C1 can be welded to the first electrode 31 at a perimeter of the first hole H1 and the second collector plate C2 can be welded to the second electrode 32 at a perimeter of the second hole H2. The weld can be formed by melting an end of the electrodes 31 and 32 nearest to the collector plates C1 and C2. Therefore, a first connection 41 between the first collector plate C1 and the first electrode 31 can be formed by a portion 43 of the first electrode 31 that was melted to form the first connection 41; and a second connection 42 between the second collector plate C2 and the second electrode 32 is formed by a portion 44 of the second electrode 32 that was melted to form the second connection 42.

The holes H1 and H2 allow visual alignment of the filament assembly 10 with the electrodes 31 and 32. Welding the filament assembly 10 to the electrodes 31 and 32 at the holes H1 and H2, respectively, can be performed at a lower temperature than if the weld were performed without the holes. The holes H1 and H2 allow visual inspection of the weld after it is completed.

The filament assembly 10 can be mounted on the pair of electrodes 31 and 32 within, at, or in front of an opening 49 of a cathode cup 33, as illustrated in FIGS. 3 and 4. The cathode cup 33 can be associated with the cathode 21. The plane 45 of the filament 11 and of the pair of collector plates C1 and C2 can be parallel with the opening 49 of the cathode cup 33.

The filament assembly 10 can have a slightly smaller diameter than the cathode cup 33 so that the cathode cup 33 forces a central alignment of the filament assembly 10. This makes manufacturing easier and can result in reduced variation between different x-ray tubes.

A filament can emit electrons in all directions. A planar filament typically emits electrons in a desirable direction, towards the anode target 24, from a top side of the planar filament that faces the target 24. The planar filament also can emit electrons in an undesirable direction, towards the cathode cup 33, from a bottom side of the planar filament. The bottom side is opposite of the top side. The electrons from the bottom side can change direction (e.g. about 180°), due to a negative voltage of the cathode cup 33, pass between filament wires, and emit towards the target 24. These electrons from the bottom side are not focused properly. Therefore, the bottom side electrons can result in a misshaped electron spot at the target 24.

The collector plates C1 and C2 can block these electrons emitted from the bottom side, and can keep these electrons within the cathode cup 33. In order to effectively block such electrons, it is useful for the collector plates C1 and C2 to block a large percent of the opening 49 of the cathode cup 33 outside of the filament 11. For example, the filament assembly 10 can block ≥70%, ≥80%, ≥90%, or ≥95% of the opening 49 of the cathode cup 33 outside of the filament 11.

The collector plates C1 and C2 can encircle a large percent of the filament 11 in order to improve blocking of electrons emitted from the bottom side. For example, the collector plates C1 and C2 can encircle a majority of the filament 11, such as ≥70%, ≥80%, ≥90%, or ≥93% of the filament 11. As another example, the collector plates C1 and C2 can encircle at least 90% of the filament 11. If the collector plates C1 and C2 encircle too large of a percent of the filament 11, then there is risk of the collector plates C1 and C2 touching, resulting in a short circuit failure. Therefore, the collector plates C1 and C2 can encircle ≤95%, ≤97.5%, or ≤99% of the filament 11.

In order to allow a voltage across the collector plates C1 or C2 to cause an electrical current through the filament 11, it is desirable for no more than one of the collector plates C1 or C2 to touch the cathode cup 33. If both collector plates C1 and C2 touch the cathode cup 33, then there would be a short circuit through the cathode cup 33, and a desired amount of electrical current would not flow through the filament 11.

In order to avoid this short circuit, the collector plates C1 and C2 can have different radii with respect to each other (R1/R2), as illustrated in FIG. 5. For example, R1>R2, where R1 is a largest radius from a center 14 of the filament 11 to an outer edge O1 of the first collector plate C1 and R2 is a largest radius from a center 14 of the filament 11 to an outer edge O2 of the second collector plate C2.

Example relationships between R1 and R2 include the following: R1/R2≥1.01, R1/R2≥1.02, R1/R2≥1.03, or R1/R2≥1.04; and R1/R2≤1.05, R1/R2≤1.1, or R1/R2≤1.2.

An area (A1) of the first collector plate C1 is typically larger than an area (A2) the second collector plate C2. A larger area (A1) of the first collector plate C1 can allow it to rest on an edge of the cathode cup 33 and support the filament assembly 10. Example relationships between the area (A1) of the first collector plate C1 and the area (A2) the second collector plate C2 include the following: A1/A2≥1, A1/A2≥3, A1/A2≥5, or A1/A2≥6; and A1/A2≤8, A1/A2≤10, or A1/A2≤15. Both areas A1 and A2 are areas of the side of the first collector plate C1 and of the second collector plate C2 that face the target 24.

The radii R1 and R2 of the collector plates C1 and C2, respectively, can be substantially larger than a largest radius Rf of the filament 11, from a center 14 of the filament 11 to an outer edge 15 of the filament 11. Example relationships between Rf and R1 include the following: R1>Rf, R1/Rf≥1.5, R1/Rf≥2, or R1/Rf≥3; and R1/Rf≤4, R1/Rf≤6, or R1/Rf≤8. Example relationships between Rf and R2 include the following: R2>Rf, R2/Rf≥1.5, R2/Rf≥2, or R2/Rf≥3; and R2/Rf≤4, R2/Rf≤6, or R2/Rf≤8. A purpose of these relationships is to place the filament 11 in a small area at a center of the cathode cup 33, but also block nearly all of an area of an opening 49 of the cathode cup 33 outside of the filament 11.

FIG. 6 is a top-view of a filament group 60 with four filament assemblies 10. During manufacturing, multiple filament assemblies 10 can be connected as shown. A shape of each filament assembly 10 can be cut in a sheet of metal by laser ablation or by patterning and etching.

The first collector plate C1 can include one, two, three, or more recessed regions 12 (FIGS. 1 and 5) at an outer perimeter. Each recessed region 12 can have a tab 13, extending outward away from the recessed region 12, for attachment to other filament assemblies 10 in the filament group 60 during manufacturing. The recessed region 12 can keep the tab 13, after it is cut, from extending beyond a radius R1 of the first collector plate C1. Thus, a largest radius 16 from a center 14 of the filament 11 to the recessed region 12 can be smaller than a largest radius R1 from a center 14 of the filament 11 to an outermost outer edge O1 of the first collector plate C1. The purpose of this is to keep the tab 13 from interfering with placement of the filament assembly in the cathode cup 33.

Tabs 12 on the first collector plate C1 can be sufficient for holding the filament assembly 10 during manufacturing. Therefore, the second collector plate C2 can be free of any recessed regions at an outer perimeter thereof. An entire outer perimeter of the second collector plate C2 can have an arc shape.

What is claimed is:

1. An x-ray tube comprising:

a cathode and an anode electrically insulated from one another, the cathode including a filament configured to emit electrons towards the anode, and the anode includes a target for generation of x-rays in response to impinging electrons from the filament;

a filament assembly includes the filament and a pair of collector plates;

the filament comprises an elongated wire extending, non-linearly in a plane, between a first end and a second end of the filament;

a planar dimension of the pair of collector plates is located in the plane;

the pair of collector plates are separated from each other;

the pair of collector plates encircle a majority of the filament;

the pair of collector plates include a first collector plate electrically-coupled to the first end of the filament and a second collector plate electrically-coupled to the second end of the filament;

a first electrode and a second electrode, each extending from outside the x-ray tube to an interior of the x-ray tube, the first electrode and the second electrode configured to provide a voltage across the filament;

the first collector plate includes a first hole aligned with the first electrode, and the second collector plate includes a second hole aligned with the second electrode;

the first electrode is bonded to the first collector plate at the first hole and the second electrode is bonded to the second collector plate at the second hole;

an electrical current path is from the first electrode to and through the first collector plate, from the first collector plate to the first end of the filament and through the filament to the second end of the filament, from the second end of the filament to and through the second collector plate to the second electrode; and the filament is capable of being heated by the voltage and an electrical current through the electrical current path.

2. The x-ray tube of claim 1, wherein an outer perimeter of the first collector plate has an arc shape and an outer perimeter of the second collector plate has an arc shape.

3. The x-ray tube of claim 2, wherein:

the arc shape of the outer perimeter of the first collector plate matches an outer curvature of the filament; and the arc shape of the outer perimeter of the second collector plate matches an outer curvature of the filament.

4. The x-ray tube of claim 1, wherein an inner perimeter of the first collector plate has an arc shape and an inner perimeter of the second collector plate has an arc shape.

5. The x-ray tube of claim 4, wherein:

the arc shape of the inner perimeter of the first collector plate matches an outer curvature of the filament; and the arc shape of the inner perimeter of the second collector plate matches an outer curvature of the filament.

6. The x-ray tube of claim 1, wherein:

a diameter of the first hole is smaller than an outer diameter of the first electrode;

the first collector plate rests on top of the first electrode;
a diameter of the second hole is smaller than an outer diameter of the second electrode; and
the second collector plate rests on top of the second electrode.

7. The x-ray tube of claim 1, wherein:
a first connection between the first collector plate and the first electrode is formed by a portion of the first electrode that was melted to form the first connection; and
a second connection between the second collector plate and the second electrode is formed by a portion of the second electrode that was melted to form the second connection.

8. The x-ray tube of claim 1, wherein R1>R2, where R1 is a largest radius from a center of the filament to an outer edge of the first collector plate and R2 is a largest radius from a center of the filament to an outer edge of the second collector plate.

9. The x-ray tube of claim 8, wherein 2≤R1/Rf and 2≤R2/Rf, where Rf is a largest radius from a center of the filament to an outer edge of the filament.

10. The x-ray tube of claim 9, wherein 3≤R1/Rf≤6 and 3≤R2/Rf≤6.

11. The x-ray tube of claim 1, wherein:
the first collector plate includes a recessed region at an outer perimeter;
a radius from a center of the filament to the recessed region is smaller than a radius from a center of the filament to an outermost outer edge of the first collector plate;
a tab extends outward away from the recessed region; and
the tab is configured for connection to another filament assembly during manufacturing.

12. The x-ray tube of claim 1, wherein:
the first collector plate includes three recessed regions at an outer perimeter;
a largest radius from a center of the filament to each recessed region is smaller than a largest radius from a center of the filament to an outermost outer edge of the first collector plate;
a tab extends outward away from each recessed region; and
each tab is configured for connection to another filament assembly during manufacturing.

13. The x-ray tube of claim 12, wherein the second collector plate is free of any recessed regions at an outer perimeter thereof and an entire outer perimeter thereof has an arc shape.

14. The x-ray tube of claim 1, wherein the pair of collector plates encircle at least 90% of the filament.

15. The x-ray tube of claim 1, wherein a thickness of the pair of collector plates equals a thickness of the filament.

16. The x-ray tube of claim 1, wherein the first electrode spans the first hole, the first electrode covers completely an opening of the first hole, the second electrode spans the second hole, and the second electrode covers completely an opening of the second hole.

17. The x-ray tube of claim 1, further comprising a cathode cup associated with the cathode, and the filament assembly is located at an opening of the cathode cup.

18. The x-ray tube of claim 17, wherein the plane of the filament and of the pair of collector plates is parallel with the opening of the cathode cup.

19. The x-ray tube of claim 17, wherein the filament assembly blocks ≥80% of the opening outside of the filament.

20. The x-ray tube of claim 1, wherein:
a top side of the pair of collector plates and of the filament are aligned, the top side faces the target; and
a bottom side of the pair of collector plates and of the filament are aligned, the bottom side faces away from the target, and the bottom side is opposite of the top side.

* * * * *